(12) United States Patent
Kim et al.

(10) Patent No.: US 8,758,196 B2
(45) Date of Patent: Jun. 24, 2014

(54) METHOD OF CONTROLLING TRANSMISSION OF VEHICLE

(75) Inventors: Sung Yeol Kim, Suwon-si (KR); Seung Min Lee, Ansan-si (KR); Choung Wan Son, Seoul (KR); Seok Young Shin, Hwaseong-si (KR); Ju Hyun Nam, Bucheon-si (KR); Sung Yop Lee, Yongin-si (KR); Kwang Min Won, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 296 days.

(21) Appl. No.: 13/292,601

(22) Filed: Nov. 9, 2011

(65) Prior Publication Data

US 2012/0312653 A1 Dec. 13, 2012

(30) Foreign Application Priority Data

Jun. 9, 2011 (KR) .................. 10-2011-0055632

(51) Int. Cl.
*B60W 10/00* (2006.01)
*F16H 59/00* (2006.01)
*F16H 61/00* (2006.01)
*F16H 63/00* (2006.01)

(52) U.S. Cl.
USPC .............. 477/70; 477/71; 477/80; 74/335

(58) Field of Classification Search
USPC ............. 477/70, 71, 79, 80, 86; 74/335
See application file for complete search history.

(56) References Cited

U.S. PATENT DOCUMENTS 6,276,224 B1 * 8/2001 Ueda et al. ............... 74/335
7,120,530 B2 * 10/2006 Yasui et al. .............. 701/51
7,222,552 B2 * 5/2007 Kouno et al. ............ 74/336 R

FOREIGN PATENT DOCUMENTS

| JP | 2002-122157 A | 4/2002 |
| JP | 2007-120572 A | 5/2007 |
| KR | 10-2008-0029137 A | 4/2008 |

* cited by examiner

*Primary Examiner* — Tisha Lewis
(74) *Attorney, Agent, or Firm* — Morgan, Lewis & Bockius LLP

(57) ABSTRACT

A method of controlling a transmission of a vehicle may include beginning synchronization between a speed shift gear of a target gear and an output shaft to shift gears from a current gear to a lower gear set as the target gear in response to deceleration of the vehicle, after the synchronization between the output shaft and an input shaft by the speed shift gear of the target gear has been completed, maintaining the synchronized state therebetween for a predetermined time period, and completing engagement with the target gear to complete the shifting of the gears after the maintaining of the synchronized state.

7 Claims, 3 Drawing Sheets

METHOD OF CONTROLLING TRANSMISSION OF VEHICLE

CROSS-REFERENCE TO RELATED APPLICATIONS

The present application claims priority to Korean Patent Application No. 10-2011-0055632 filed on Jun. 9, 2011, the entire contents of which is incorporated herein for purposes by this reference.

BACKGROUND OF THE INVENTION

1. Field of the Invention

The present invention relates generally to methods of controlling transmissions of vehicles and, more particularly, to a technique for preventing a shift shock from occurring when shifting gears in response to deceleration of a vehicle that is provided with an AMT (automated manual transmission) including a DCT (double clutch transmission), etc.

2. Description of Related Art

A process of downshifting when a vehicle provided with a conventional DCT decelerates will be described with reference to FIG. 1.

When the vehicle decelerates, a transmission controller drives an actuator so that a corresponding synchronizer is operated to achieve gear engagement of a target gear that is lower than the current gear.

Typically, the actuator linearly moves a sleeve of the synchronizer to conduct synchronization and engagement of a related speed shift gear.

As stated above, when the actuator begins to operate, the sleeve compresses a synchronizer ring towards a clutch gear of the target gear by means of a key so that the synchronization begins (at a point of time T1 of FIG. 1). A second input shaft which engages with the speed shift gear of the target gear is synchronized with an output shaft, and the rpm of the second input shaft thereby increases.

During this process, an increase of the rpm of the second input shaft results from transmission of rotating force of the output shaft to the second input shaft through the synchronizer. This means the torque of the output shaft is used to increase the speed of the inertial mass pertaining to the second input shaft. Due to the torque transmitted from the output shaft to the second input shaft, backlash of elements, such as gears, etc., from the second input shaft to the output shaft are arranged in one direction.

After, the synchronization has been conducted as described above, the rpm of the second input shaft becomes equal to that of the output shaft. Subsequently, when the sleeve is further moved by the operation of the actuator, the sleeve passes over the synchronizer ring and the key. Thereby, the compression force with which the sleeve pushed the synchronizer ring is removed, resulting in a momentary breakdown of the synchronization (from T2 to T3).

Thereafter, when the sleeve is further moved by the operation of the actuator, the sleeve engages with the clutch gear of the target gear, thus completing the gear shifting (after T3).

During breakdown of the synchronization, if there is no frictional resistance induced as a result of the rotation of the second input shaft, the second input shaft is in free rotation and thus maintains the rpm when in the synchronized state. The rpm of the output shaft reduces because the vehicle is decelerating. As a result, just before the sleeve engages with the clutch gear, the rpm of the second input shaft exceeds that of the output shaft.

In this state, if the sleeve just moves and engages with the clutch gear, torque is applied to the elements in the direction in which the second input shaft that is faster than the output shaft rotates the output shaft. Thus, the backlash of the elements that have been arranged in one direction when the synchronization begins are rearranged in the reverse direction. Because of such a phenomenon, the elements, such as gears, between the second input shaft and the output shaft that have been rotating at high speeds collide with each other, thus causing shock.

Such shift shock and noise which are induced during the above-mentioned process of the conventional technique deteriorate the quietness of the vehicle, causes a user discomfort, and reduce the marketability of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling a transmission of a vehicle in such a way that, when shifting gears from the current gear to a lower gear in response to deceleration of the vehicle provided with a transmission mechanism in which an actuator operates a sleeve to conduct synchronization, shift shock and noise are prevented from being induced by the backlash occurring between elements between an input shaft and an output shaft, thus enhancing the gear shift quality, thereby improving the quietness and riding comfort of the vehicle, and enhancing the marketability of the vehicle.

In an aspect of the present invention, a method of controlling a transmission of a vehicle may include beginning synchronization between a speed shift gear of a target gear and an output shaft to shift gears from a current gear to a lower gear set as the target gear in response to deceleration of the vehicle, after the synchronization between the output shaft and an input shaft by the speed shift gear of the target gear has been completed, maintaining the synchronized state therebetween for a predetermined time period, and completing engagement with the target gear to complete the shifting of the gears after the maintaining of the synchronized state.

The beginning of the synchronization may include controlling an actuator to begin to linearly move a sleeve of the target gear towards a clutch gear of the target gear, the maintaining of the synchronized state may include controlling the actuator to stop the linear movement of the sleeve, and the completing of the engagement with the target gear may include controlling the actuator to additionally move the sleeve linearly.

At the beginning of the synchronization, a position of the sleeve, when an rpm increase rate of the input shaft reaches a predetermined rpm increase rate, is determined as a criterion position, and a position of the sleeve at the maintaining of the synchronized state is controlled to be the criterion position.

The position of sleeve is controlled to be between an upper limit and a lower limit, the upper and lower limits being above and below the criterion position respectively.

The method may include holding a position of the sleeve when an rpm increase rate of the input shaft reaches a predetermined rpm increase rate after the beginning of the synchronized state and before the maintaining of the synchronized state.

The predetermined time period of the maintaining is set as a time period taken until backlash of elements between the input shaft and the output shaft that have been arranged in one direction at the beginning of the synchronized state are arranged in a reverse direction by the output shaft which are decelerating.

In another aspect of the present invention, a method of controlling a transmission of a vehicle may include moving a sleeve by using an actuator to begin synchronization between a speed shift gear of a target gear and an output shaft when shifting gears from a current gear to a lower gear set as the target gear is required in response to deceleration of the vehicle; after the synchronization between the output shaft and an input shaft by the speed shift gear of the target gear has been completed, maintaining the synchronized state therebetween for a predetermined time period; and completing engagement with the target gear to complete the shifting of the gears after the maintaining of the synchronized state.

After the synchronization between the speed shift gear of the target gear and the output shaft is begun by the movement of the sleeve, when an rpm increase rate of the input shaft reaches a predetermined rpm increase rate, a position of the sleeve is held to complete the synchronization between the output shaft and the input shaft using the speed shift gear of the target gear, and the synchronized state therebetween is maintained for the predetermined time period.

The predetermined time period is set as a time period taken until backlash of elements between the input shaft and the output shaft that have been arranged in one direction when the synchronization is begun by the movement of the sleeve are arranged in a reverse direction by the output shaft which is decelerating.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
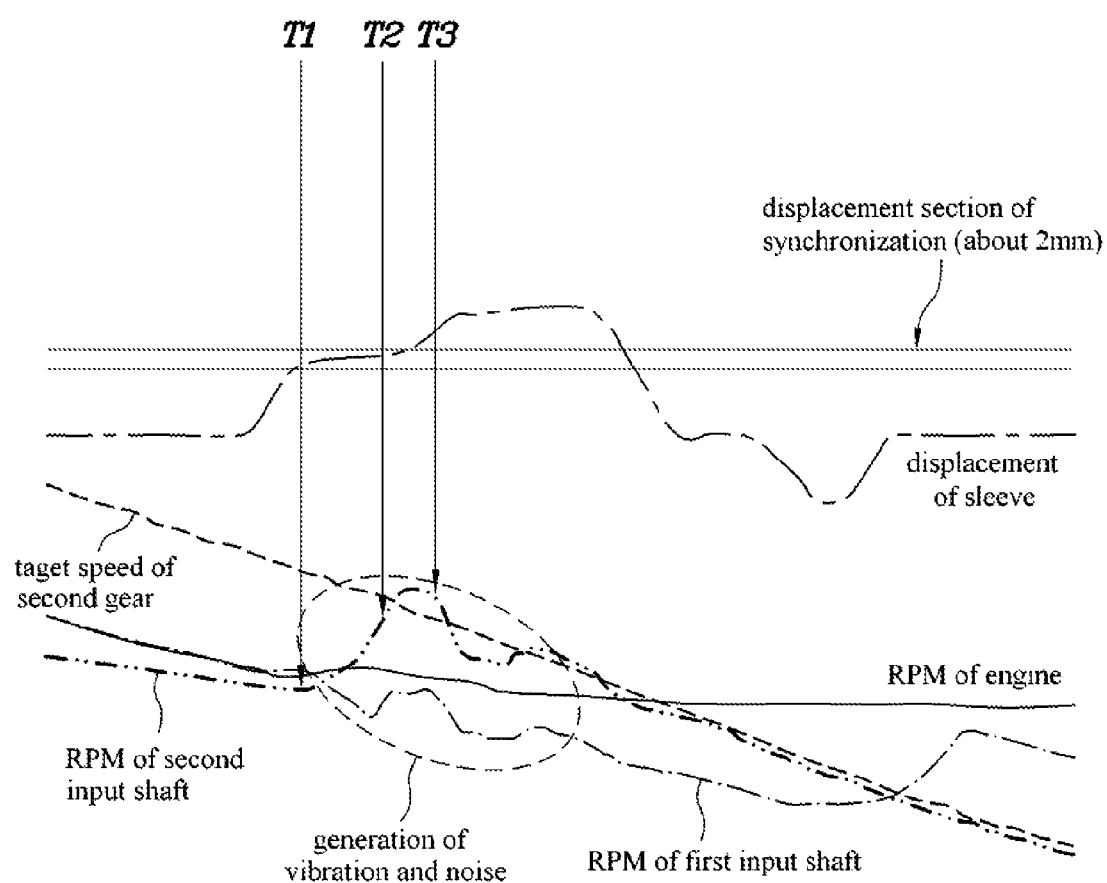
FIG. 1 is a graph illustrating downshifting when a vehicle provided with a conventional DCT decelerates.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within spirit and scope of the invention as defined by the appended claims.

Hereinafter, the present invention will be described in detail with reference to the attached drawings.

Figure 2:
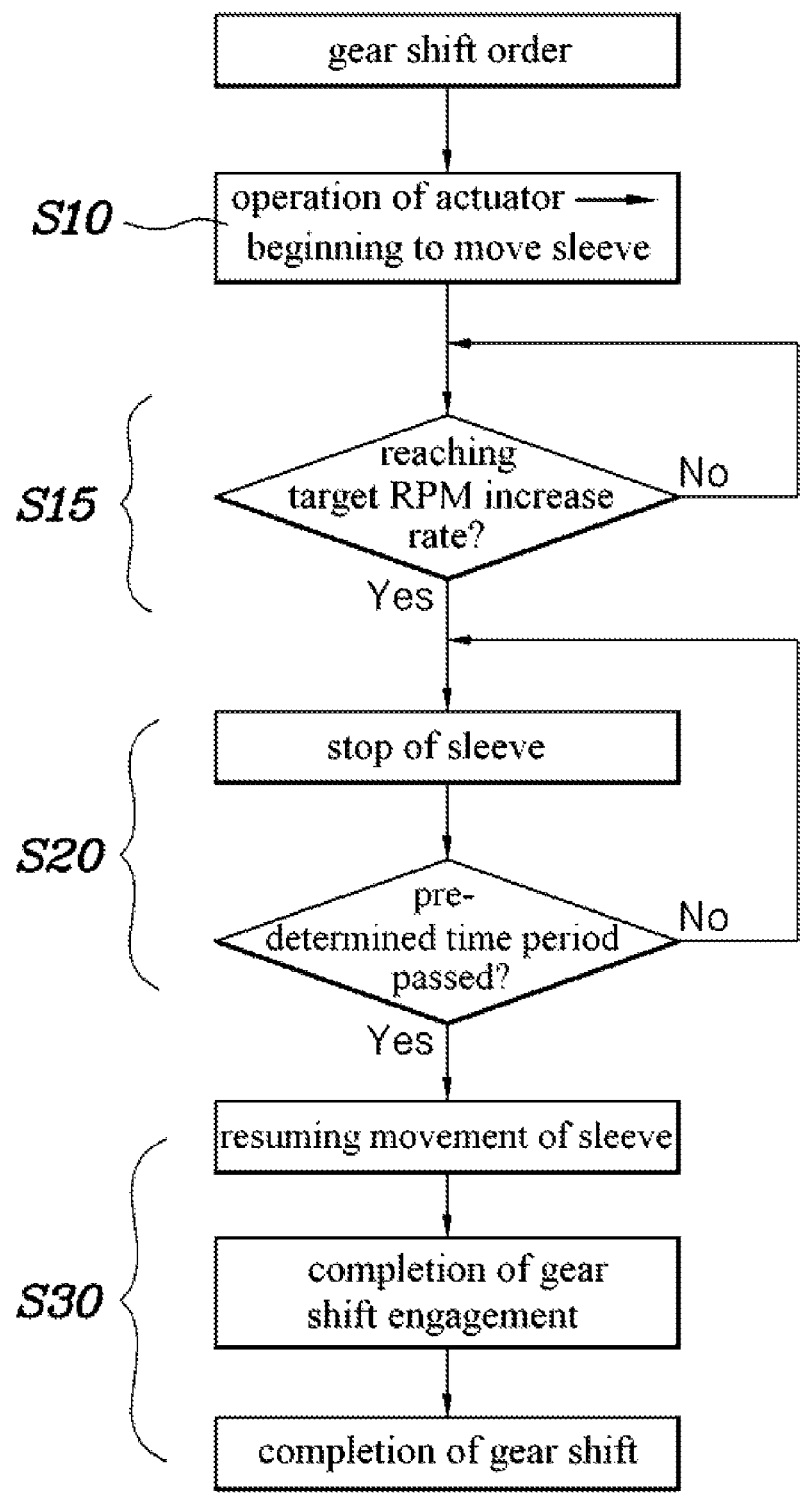
FIG. 2 is a flowchart of a method of controlling a transmission of a vehicle according to an exemplary embodiment of the present invention.
Figure 3:
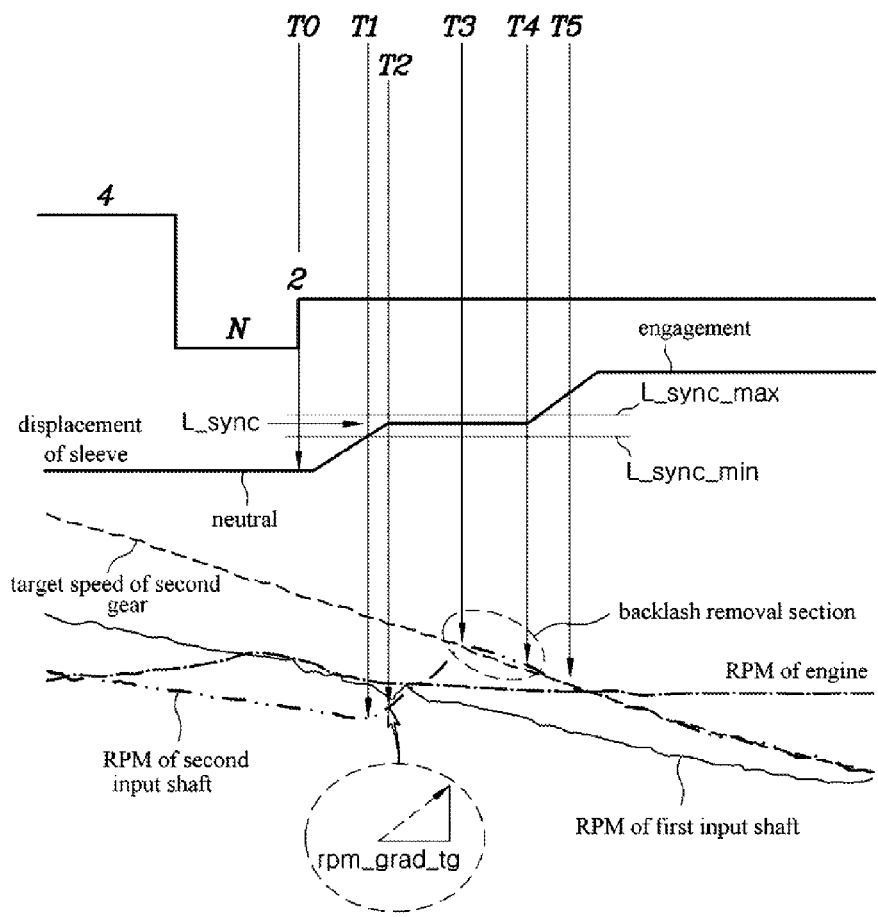
FIG. 3 is a graph illustrating a gear shift according to the control method of FIG. 2.

Referring to FIGS. 2 and 3, a method of controlling a transmission of a vehicle according to an exemplary embodiment of the present invention includes a gear shift beginning step S10, a synchronization maintenance step S20 and a gear shift completion step S30. At the gear shift beginning step S10, synchronization between a speed shift gear of a target gear and an output shaft begins when shifting gears from the current gear to a lower gear is required in response to deceleration of the vehicle. At the synchronization maintenance step S20, after the synchronization between the output shaft and an input shaft by the speed shift gear of the target gear has been completed, the synchronized state is maintained for a predetermined time period. At the gear shift completion step S30, after the synchronization maintenance step S20, gear shifting is completed by completing engagement with the target gear.

As such, in an exemplary embodiment of the present invention, the synchronization maintenance step S20 is conducted between the gear shift beginning step S10 and the gear shift completion step S30 so that the input shaft and the output shaft that have been in a backlash arrangement state caused at the gear shift beginning step S10 is smoothly rearranged in the reverse direction. Therefore, unlike the conventional technique, shift shock and noise can be prevented from occurring due to the change in the direction of the backlash.

The gear shift beginning step S10 is conducted by controlling an actuator to begin to move a sleeve of the target gear towards a clutch gear of the target gear. Referring to FIG. 3, as an order of a gear shift from the current gear to the target gear is generated in response to deceleration of the vehicle, the actuator is operated from T0 so that the sleeve begins to move. From T1 synchronization force is generated so that the synchronization begins, thereby slowly increasing the rpm of the input shaft.

For reference, FIG. 3 illustrates a gear shift of a DCT including a first input shaft and a second input shaft. The target gear, into which the gear is required to be shifted, is a second gear, and the input shaft connected to the target gear denotes the second input shaft. Hence, judging from conditions of FIG. 3, the input shaft mentioned in the description of the present invention means the second input shaft.

Further, a synchronizer of the transmission that is premised in the present embodiment is configured in such a way that: a synchronizer ring is compressed towards the clutch gear by linear movement of the sleeve to begin synchronization, when the sleeve passes over the synchronizer ring and engages with the clutch gear, gear shifting is completed, the clutch gear which is integrated with the speed shift gear of the target gear is operated such that power is transmitted from a hub that is disposed at the center of the sleeve to the speed shift gear via the sleeve and the clutch gear, and the actuator linearly moves the sleeve under the control of a transmission controller.

The synchronization maintenance step S20 is conducted by controlling the actuator to stop the linear movement of the sleeve. The gear shift completion step S30 is conducted by controlling the actuator to additionally linearly move the sleeve.

In other words, the present invention uses a technique that can be applied to most AMTs including DCTs in which a gear shift is conducted by controlling the actuator to control the linear movement of the sleeve. All steps including the gear shift beginning step S10 and the synchronization maintenance step S20 and the gear shift completion step S30 are conducted by controlling the actuator. In particular, the synchronization maintenance step S20 is conducted by controlling the actuator so that the sleeve stops or the position thereof is limited within a predetermined range.

In the present embodiment, the method of the present invention further includes a sleeve holding beginning step S15 at which the position of the sleeve is held when the rpm increase rate of the input shaft reaches a predetermined rpm increase rate after the gear shift beginning step S10 and before the synchronization maintenance step S20.

In other words, at the gear shift beginning step S10, the position of the sleeve, when the rpm increase rate of the input shaft reaches the predetermined rpm increase rate (rpm_grad_tg), is determined as a criterion position, and the position of the sleeve at the synchronization maintenance step S20 is controlled to be the criterion position. This corresponds to a point of time T2 of FIG. 3.

In detail, the synchronization maintenance step S20 begins after the rpm of the input shaft is completely synchronized with the rpm of the output shaft (that is, after a point of time T3 of FIG. 3). At this time, the position of the sleeve is the position of the sleeve that was already determined at the sleeve holding beginning step S15. The position of the sleeve is continuously controlled to be the criterion position since the sleeve holding beginning step S15 to the completion of the synchronization maintenance step S20.

As stated above, simply holding the sleeve at the criterion position is one of detailed examples of a method of controlling the sleeve to be at the criterion position. In another example, as shown in FIG. 3, a method may be used, in which the upper limit (L_sync_max) and the lower limit (L_sync_min) are set above and below the criterion position and the position (L_sync) of the sleeve is controlled to be between the upper limit and the lower limit.

Meanwhile, the term "predetermined rpm increase rate (rpm_grad_tg)" means an increase rate of the rpm of the input shaft versus time at a point of time at which the rpm of the input shaft begins to linearly increase, while the input shaft is synchronized with the output shaft and the rpm thereof increases as the sleeve moves towards the clutch gear of the target gear at the gear shift beginning step S10. In physical terms, the term "predetermined rpm increase rate (rpm_grad_tg)" means a variation of the rpm of the input shaft per time at a point of time at which the rpm of the input shaft reaches the rpm of the output shaft after having linearly increased within a range in which although the sleeve maintains in its current condition without moving any more, satisfactory responsivity in a gear shift is ensured. The predetermined rpm increase rate can be determined by a plurality of tests and analyses.

Therefore, as mentioned above, when the rpm increase rate of the input shaft reaches the predetermined rpm increase rate as the result of the synchronization, the sleeve holding beginning step S15 begins and then the synchronization maintenance step S20 is conducted. Here, the rpm of the input shaft linearly increases after the sleeve holding beginning step S15 and then is synchronized with the rpm of the output shaft without undergoing an over-shooting phenomenon in which the rpm of the input shaft exceeds the rpm of the output shaft. From this point of time, the synchronization maintenance step S20 is conducted.

The predetermined time period of the synchronization maintenance step S20 is set as the time period it takes until the backlash of elements between the input shaft and the output shaft, which have been arranged in one direction at the gear shift beginning step S10 are arranged in the reverse direction by the output shaft which is decelerating. The predetermined time period is also preferably determined by tests and analyses. For reference, in FIG. 3, the synchronization maintenance step S20 is an operation from T3 to T4.

At the synchronization maintenance step S20, the sleeve maintains the almost fixed state. Therefore, unlike the conventional typical gear shift, even at a point of time at which breakdown of the synchronization occurs after the input shaft has been initially synchronized with the output shaft, the input shaft is continuously connected to the output shaft, thus maintaining the synchronized state.

At this time, because the vehicle is decelerating, the rpm of the output shaft is reduced. The rpm of the input shaft increases at the gear shift beginning step S10 while it is synchronized with the rpm of the output shaft, and after the synchronization has completed, the rpm of the input shaft is reduced in response to the rpm of the output shaft during the synchronization maintenance step S20.

At the synchronization maintenance step S20, the input shaft is biased to rotate at a speed higher than that of the output shaft due to rotary inertia. Contrary to this, because the rpm of the output shaft is slowly reduced by deceleration of the vehicle, the related elements, which were in a backlash arrangement that is induced as the rpm of the input shaft is increased by the output shaft at the gear shift beginning step S10, are rearranged in the reverse direction as the rpm of the input shaft is reduced by the output shaft. This state is the same as the state in which the input shaft operates the output shaft. Therefore, thereafter, shift shock or noise is prevented from occurring due to a variation in the backlash arrangement of the related elements while power is transmitted from the input shaft to the output shaft.

The term "related elements" that pertains to the backlash arrangement denote elements of the synchronizer, such as the hub, the sleeve, the clutch gear, the speed shift gear, etc., which pertain to the target gear.

After the synchronization maintenance step has completed, the gear shift completion step is conducted in which the sleeve further moves to completely engage with the clutch gear of the target gear.

Here, if the force used to further move the sleeve is set to an appropriate degree such that it is not excessive or insufficient, another backlash can be prevented from occurring, and collision between the gears can be prevented, thus further enhancing the gear shift quality.

As described above, in a method of controlling a transmission of a vehicle according to an exemplary embodiment of the present invention, when shifting gears from the current gear to a lower gear in response to deceleration of the vehicle provided with a transmission mechanism in which an actuator operates a sleeve to conduct synchronization, shift shock and noise can be prevented from being induced by backlash occurring between elements between an input shaft and an output shaft. Therefore, the gear shift quality is enhanced, thus improving the quietness and riding comfort of the vehicle, and enhancing the marketability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A method of controlling a transmission of a vehicle, comprising:
   beginning synchronization between a speed shift gear of a target gear and an output shaft to shift gears from a current gear to a lower gear set as the target gear in response to deceleration of the vehicle;
   after the synchronization between the output shaft and an input shaft by the speed shift gear of the target gear has been completed, maintaining the synchronized state therebetween for a predetermined time period; and
   completing engagement with the target gear to complete the shifting of the gears after the maintaining of the synchronized state;
   wherein the predetermined time period of the maintaining is set as a time period taken until backlash of elements between the input shaft and the output shaft that have been arranged in one direction at the beginning of the synchronized state are arranged in a reverse direction by the output shaft which are decelerating.

2. The method as set forth in claim 1, wherein
   the beginning of the synchronization includes controlling an actuator to begin to linearly move a sleeve of the target gear towards a clutch gear of the target gear;
   the maintaining of the synchronized state includes controlling the actuator to stop the linear movement of the sleeve; and
   the completing of the engagement with the target gear includes controlling the actuator to additionally move the sleeve linearly.

3. The method as set forth in claim 2, wherein at the beginning of the synchronization, a position of the sleeve, when an rpm increase rate of the input shaft reaches a predetermined rpm increase rate, is determined as a criterion position, and a position of the sleeve at the maintaining of the synchronized state is controlled to be the criterion position.

4. The method as set forth in claim 3, wherein the position of sleeve is controlled to be between an upper limit and a lower limit, the upper and lower limits being above and below the criterion position respectively.

5. The method as set forth in claim 2, further comprising:
   holding a position of the sleeve when an rpm increase rate of the input shaft reaches a predetermined rpm increase rate after the beginning of the synchronized state and before the maintaining of the synchronized state.

6. A method of controlling a transmission of a vehicle, comprising:
   moving a sleeve by using an actuator to begin synchronization between a speed shift gear of a target gear and an output shaft when shifting gears from a current gear to a lower gear set as the target gear is required in response to deceleration of the vehicle;
   after the synchronization between the output shaft and an input shaft by the speed shift gear of the target gear has been completed, maintaining the synchronized state therebetween for a predetermined time period; and
   completing engagement with the target gear to complete the shifting of the gears after the maintaining of the synchronized state;
   wherein after the synchronization between the speed shift gear of the target gear and the output shaft is begun by the movement of the sleeve, when an rpm increase rate of the input shaft reaches a predetermined rpm increase rate, a position of the sleeve is held to complete the synchronization between the output shaft and the input shaft using the speed shift gear of the target gear, and the synchronized state therebetween is maintained for the predetermined time period.

7. The method as set forth in claim 6, wherein the predetermined time period is set as a time period taken until backlash of elements between the input shaft and the output shaft that have been arranged in one direction when the synchronization is begun by the movement of the sleeve are arranged in a reverse direction by the output shaft which is decelerating.

* * * * *